United States Patent
Flaig

(10) Patent No.: US 9,267,534 B2
(45) Date of Patent: Feb. 23, 2016

(54) LOCK NUT

(76) Inventor: Hartmut Flaig, Aldingen (DE)

( * ) Notice: Subject to any disclaimer, the term of this patent is extended or adjusted under 35 U.S.C. 154(b) by 292 days.

(21) Appl. No.: 13/382,139

(22) PCT Filed: Jul. 3, 2009

(86) PCT No.: PCT/EP2009/004823
§ 371 (c)(1),
(2), (4) Date: Mar. 22, 2012

(87) PCT Pub. No.: WO2011/000393
PCT Pub. Date: Jan. 6, 2011

(65) Prior Publication Data
US 2012/0177460 A1    Jul. 12, 2012

(51) Int. Cl.
*F16B 39/22*    (2006.01)
*F16B 39/38*    (2006.01)

(52) U.S. Cl.
CPC ..................... *F16B 39/38* (2013.01)

(58) Field of Classification Search
CPC .......... F16B 39/38; F16B 39/12; F16B 39/24; F16B 39/34; F16B 43/00; F16B 41/002; F16B 39/22
USPC ......... 411/275, 222, 260, 261, 263, 302, 246, 411/253, 204, 265, 533, 544
See application file for complete search history.

(56) References Cited

U.S. PATENT DOCUMENTS

| | | | | | |
|---|---|---|---|---|---|
| 183,472 | A | * | 10/1876 | Scott | 411/253 |
| 1,049,765 | A | * | 1/1913 | Reed | 411/261 |
| 2,001,645 | A | * | 5/1935 | Abell | 411/204 |
| 2,222,460 | A | * | 11/1940 | Crowley | 411/285 |
| 2,318,397 | A |   | 5/1943 | Hungerford |  |
| 2,318,398 | A | * | 5/1943 | Hungerford | 411/263 |
| 2,393,323 | A | * | 1/1946 | Hungerford et al. | 411/302 |
| 2,410,090 | A |   | 10/1946 | Lusher |  |
| 2,450,694 | A |   | 10/1948 | Sauer et al. |  |
| 3,275,054 | A |   | 9/1966 | Ohl |  |

(Continued)

FOREIGN PATENT DOCUMENTS

DE    1815585 A    6/1970
DE    2638560 C3    2/1981

(Continued)

OTHER PUBLICATIONS

International Search Report issued by the ISA/EPO for PCT/EP2009/004823; date of mailing Mar. 18, 2010.

(Continued)

*Primary Examiner* — Roberta Delisle
(74) *Attorney, Agent, or Firm* — Grossman, Tucker, Perreault & Pfleger, PLLC

(57) ABSTRACT

The invention provides a lock nut with a nut body which has a threaded section with an internal thread and an adjoining inner annular groove. An annular lock washer made of metal is held in the annular groove. An internal thread corresponding to the nut thread is cut into the inner circumference of the annular washer, and the internal thread of the annular washer is offset axially in relation to the nut thread by a distance which is smaller than a thread pitch of the nut thread. According to the invention, the thickness of the annular washer at the inside diameter thereof is greater than the thickness of the annular washer at the outside diameter to thereof. As a result, the elasticity of the annular lock washer and the holding force of the lock nut can be adjusted.

17 Claims, 5 Drawing Sheets

(56) References Cited

U.S. PATENT DOCUMENTS

| | | | |
|---|---|---|---|
| 3,316,338 | A | 4/1967 | Rieke |
| 3,520,342 | A | 7/1970 | Scheffer |
| 4,019,550 | A | 4/1977 | DeHaitre |
| 4,173,034 | A | 10/1979 | Shemitz |
| 4,248,285 | A | 2/1981 | Flaig |
| 4,600,343 | A * | 7/1986 | Frerejacques ............ 411/303 |
| 5,020,953 | A * | 6/1991 | Wada ...................... 411/247 |
| 5,454,675 | A | 10/1995 | DeHaitre |
| 6,210,091 | B1 * | 4/2001 | Ono et al. ............... 411/303 |
| 8,087,863 | B2 * | 1/2012 | Flaig ...................... 411/277 |

FOREIGN PATENT DOCUMENTS

| | | |
|---|---|---|
| DE | 8424281 U1 | 1/1986 |
| DE | 2813994 C2 | 9/1987 |
| DE | 3640225 C2 | 9/1988 |
| DE | 4313809 C1 | 2/1994 |
| DE | 4313855 C2 | 11/2003 |
| EP | 0047061 A1 | 3/1982 |
| GB | 610355 | 10/1948 |
| GB | 2287764 A | 9/1995 |

OTHER PUBLICATIONS

English Translation of the International Preliminary Report on Patentability issued by the ISA/EPO for PCT/EP2009/004823; date of mailing Mar. 15, 2011.

English Translation of the International Search Report issued by the ISA/EPO for PCT/EP2009/004823; date of mailing Mar. 18, 2010.

* cited by examiner

LOCK NUT

The invention relates to a lock nut. Lock nuts of this type are described e.g. in DE 2638560 C, DE 43 13 809 C1, and DE 43 13 855 C1.

The lock nut to which the invention pertains includes a metal body having an internal thread and an adjoining neck extension which is deformed into the shape of an annular groove in which a locking washer disk is held in friction contact. At the inner edge of the locking washer disk, a thread corresponding to the nut thread is cut, and the internal thread of the locking washer disk is offset axially in relation to the nut thread by a distance which is smaller than a thread pitch of the nut thread. The locking washer disk has a certain elasticity in the axial direction so that the clamping force of the lock nut can be adjusted via the offset of the internal thread of the locking washer disk and that the lock nut maintains said adjusted clamping force through many screwing cycles.

The known lock nut has excellent locking features and hence has been successful on the market. For increasing the elasticity of the locking washer disk, which can be desirable for certain nut sizes or under extreme temperature conditions, the patents cited above propose to provide the disk with segment-like peripheral recesses at its outer circumference and optionally with additional notches. This makes it possible to manufacture the locking washer disk from a hard elastic material, such as spring steel, and nevertheless obtain the elasticity necessary for the desired axial deflection. Nevertheless, the elastic restoring force remains high so that high clamping and holding forces can be obtained. Because the annular disk is made from a material which is at least as hard as that of the threaded nut, the threads of the locking washer disk remain unharmed even after many screwing cycles so that the lock nut can be loosened and tightened a plurality of times without any noticeable change of the holding force in the locking position. Materials can be used which can withstand very high temperatures, which is of importance, e.g. when used in motor vehicles.

The patents cited above propose useful solutions for optimizing the elasticity of the locking washer disk by providing recesses at the outer periphery of the disk. In certain cases, however, an even greater elasticity of the locking washer disk and a better adjustability of the clamping force of the lock nut can be desirable.

The prior art also discloses lock nuts including a locking and sealing ring made from plastic which is held in a neck extension of the nut body, similar to the lock nut to which the invention pertains. Such lock nuts are described e.g. in EP 0 047 061 A1, DE-A-1 815 585, DE 28 13 994 C2, DE 36 40 225 C2, DE 84 24 281 U1, U.S. Pat. No. 4,019,550, U.S. Pat. No. 3,275,054, U.S. Pat. No. 3,316,338, U.S. Pat. No. 2,450, 694, U.S. Pat. No. 5,454,675. These lock nuts, however, are based on a different principle of operation. An initially unthreaded portion of the plastic locking and sealing ring is immediately adjacent to the internal thread of the nut and slightly protrudes from the internal thread. By screwing a bolt into the nut, the bolt cuts into the inner periphery of the locking and sealing disk. The largest part of the cited documents deals with the disposal and receipt of the displaced plastic material when screwing the bolt into the nut.

The teaching of this prior art can not be used for adjusting the elasticity and holding force of the locking washer disk of a lock nut according to the invention because, among others, the plastic disk behaves differently in terms of its elasticity than a disk made of metal and because this prior art does not provide for an axial offset of the internal thread of the annular disk relative to the nut body. The holding force of this type of lock nuts is based on a different principle of operation.

GB 2 287 764 A describes a lock nut having, in its cross-section, an L-shaped locking washer disk made of metal which is slid over a corresponding shoulder at a face end of the lock nut. An internal thread is cut into the nut body and the locking washer disk, having the same pitch and depth, so that a bolt can be screwed in, without providing any offset of the thread. The locking washer disk is shaped to have a concave curvature, directed to the outside, and will be pressed into the nut body when screwing the bolt into the nut so that, after screwing the bolt into the nut, the locking washer disk lies flush against the end face of the nut body. Also in this state, after screwing in the bolt, there is no offset between the internal thread of the lock nut and the annular disk. Also this lock nut hence is based on a different principle of operation than the lock nuts of the invention, discussed initially.

It is an object of the invention to further optimize and adjust both the elasticity of the locking washer disk as well as the clamping force of the lock nut.

The invention provides a lock nut including a nut body having a threaded section including an internal thread—designated as "nut thread"—and an adjacent inner ring groove. An annular disk of metal is held in the ring groove. At the inner circumference of the annular disk is cut an internal thread corresponding to the nut thread, and the internal thread of the annular disk is offset axially relative to the nut thread by a distance which is smaller than a thread pitch of the nut thread. According to the invention, the thickness of the annular disk at its inner periphery is larger than the thickness of the annular disk at its outer periphery. In the preferred embodiment of the invention, the thickness of the annular disk at its outer periphery is the same or smaller than about one thread pitch of the nut thread, and the thickness of the annular disk at its inner periphery is in the range of about one thread pitch to about 2.5 thread pitches. In a particularly preferred embodiment, the thickness of the annular disk at its outer periphery is about 0.75 thread pitches of the nut thread, and the thickness of the annular ring at its inner periphery is about 1.5 thread pitches of the nut thread.

By forming the annular disk to have an increasing thickness from its outer periphery or diameter to its inner periphery or diameter, it is possible to optimize the elasticity of the annular disk and, at the same time, to adjust the clamping force of the lock nut as needed. The elasticity of the annular disk is largely, albeit not exclusively, determined by the absolute thickness of the annular disk as well as by the relationship of its thickness at the inner diameter to the thickness at the outer diameter. The clamping force of the lock nut is largely determined by the absolute thickness of the annular disk as well as by the size of the offset of the internal thread of the annular disk relative to the nut thread. Additionally, the larger the number of thread turns at the inner diameter of the annular disk, the larger is the generated breaking torque, wherein experience teaches that, at a thickness of more than 2 or 2.5 thread turns, the annular disk generates a too large breaking torque to be used in practice. On the other hand, a larger thickness of the annular disk at its inner diameter, e.g. in the area of 1.5 to 2 thread turns, allows to receive larger screwing forces because a larger surface pressure is generated. As the forces are distributed over a larger surface, the problem of fretting, i.e. local cold-welding, when screwing-in the bolt using very large screwing forces can be avoided. As the prior art on which the invention is based describes that the constant thickness of the locking washer disk shall correspond to about one thread pitch, the present invention can vary the elasticity of the annular disk by reducing its thickness at its outer diameter, and the invention can adjust the clamping force by enlarging its thickness at the inner diameter. Such a variation of the thickness of the locking washer disk across its diameter for adjusting, on the one hand, the elasticity of the annular disk and, on the other hand, the clamping force of the lock nut is not suggested by the prior art. The invention hence enables to dimension the lock nut for different applications, from use in light engineering to automotive and railroad engineering.

In a preferred embodiment of the invention, the annular disk has a thickness which increases stepwise from its outer diameter to its inner diameter wherein the elasticity of the annular disk is adjusted by the height, position and run of the step. In another embodiment, the thickness of the annular disk increases continuously from its outer diameter to its inner diameter.

In a particularly preferred embodiment, the annular disk is curved convexly in the direction of the end face of the lock nut, i.e. towards the outside. This curvature determines a defined orientation of the annular disk so that, when generating the axial offset between the internal thread of the annular disk and the nut thread, a defined deformation is achieved.

As in the prior art on which this invention is based, the axial offset of the internal thread of the annular disk relative to the nut thread corresponds to a distance which preferably is about one quarter to half of a thread pitch.

As also known from this prior art, at the outer periphery of the annular disk, there can be a number of recesses formed into the periphery of the annular disk for further increasing the elasticity of the annular disk. The recesses form protruding claws which help to hold the annular disk in frictional contact within the annular groove. The recesses between the claws should have at least the same dimension along the periphery as the claws. Advantageously, three claws are equally spaced along the periphery.

In a further preferred embodiment, in the area of the annular groove, a calibration step is provided for compensating for manufacturing tolerances, the calibration step being deformable when inserting the annular disk. Alternatively or additionally, a calibrating step can be formed at the outer periphery of the annular disk which can be deformed when inserting the annular disk into the annular groove.

As known from the prior art discussed above, the annular disk is made from metal, in particular spring steel. Also the nut body is made from metal, in particular, steel.

The invention also provides a method for manufacturing a lock nut of the type discussed above. In the preferred embodiment of the invention, the annular disk is first manufactured, in a pre-processing step, to have a convex curvature and, subsequently, is inserted into a recess in the neck extension of the nut body, wherein no thread has been cut yet, so that the annular disk is convexly curved in the direction of the end face of the nut body. Subsequently, the neck extension is crimped radially towards the inside for clamping the outer edge of the annular disk in an axial direction. In a subsequent one-step process, an identical internal thread is cut into the nut body and the annular disk and, subsequently, the inner part of the annular disk is deformed by a defined distance in an axial direction for generating the offset between the internal thread of the annular disk and the nut thread. This deformation proceeds against the direction of curvature of the annular disk so that the convex curvature of the annular disk is reduced but not compensated or reversed. The convex curvature of the annular disk increases its elasticity so that also the degree of convex curvature of the annular disk can be used for adjusting the elasticity of the annular disk.

The invention is now described with reference to preferred embodiments having regard to the drawings. In the drawings.

Figure 1:
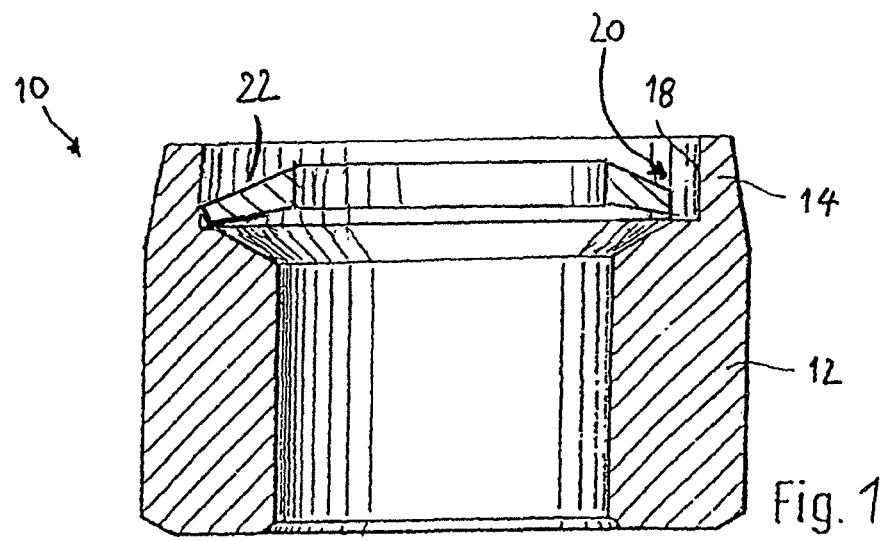
FIG. 1 shows a vertical section through the lock nut according to the invention, with a locking washer disk inserted in a pre-assembled state, along line I-I.
Figure 2:
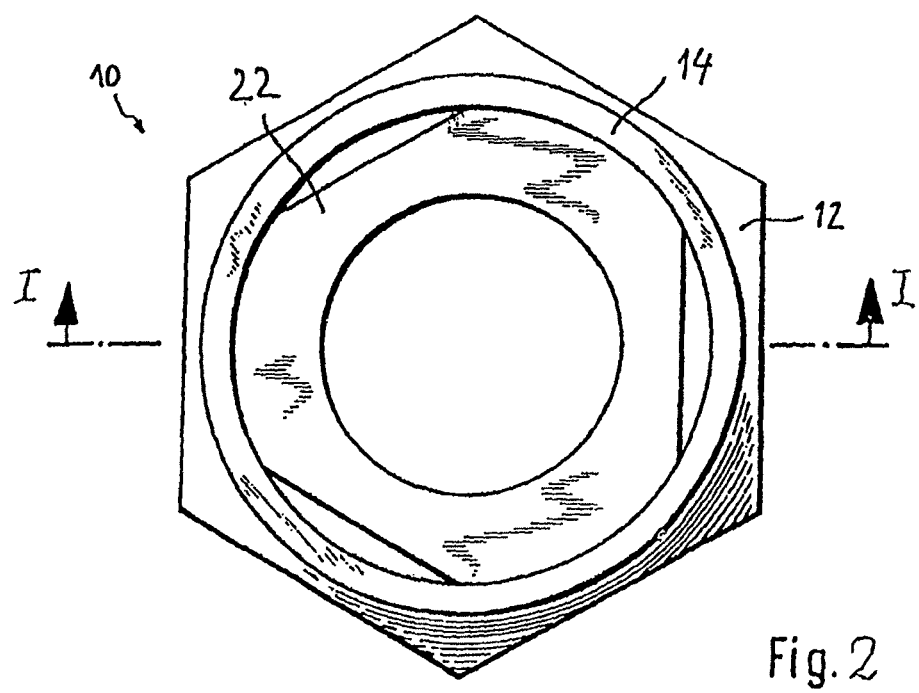
FIG. 2 shows a plan view of the lock nut, with the locking washer disk inserted, according to FIG. 1.

As shown in FIGS. 1 to 4, the lock nut 10 according to the invention comprises a nut body 12 having a concentric neck extension 14 at its end face. The lock nut 10 is e.g. manufactured as a hexagonal nut from steel and comprises, in the completed stage shown in FIGS. 3 and 4, an internal thread 16 which, in the following, is called "nut thread 16". The inner edge 18 of the neck extension 14 is offset to the outside when compared to the core diameter of the lock nut 10 for forming an accommodation space 20 for the locking washer disk 22. The locking washer disk, in the following also referred to as annular disk, is made from metal, preferably a spring material such as spring steel or string band steel. In the embodiment shown in FIGS. 1 to 4, the annular disk 22 comprises three segmented recesses wherein the annular disk is fixed within the lock nut at its peripheral regions remaining between said recesses, as is generally known in the prior art discussed above.

Different from this prior art, the annular disk 22 does not have a uniform thickness but the thickness of the annular disk at its inner diameter is larger than at the thickness of the annular disk at its outer diameter. This property is discussed in further detail with reference to FIGS. 5 to 7.

By varying the thickness of the locking washer disk 22 over its diameter, as discussed initially, the elasticity of the annular disk is optimized and the clamping force of the nut is adjusted. In the preferred embodiment of the invention, the thickness of the annular disk 22 at its outer diameter is the same or smaller than the height of one thread turn or thread pitch of the nut thread 16, preferably it is in the range from one half to one thread pitch, particularly preferred is a value of about three quarters of one thread pitch. The thickness of the annular disk at its inner diameter is preferably larger or the same as one thread pitch and smaller or the same as 2.5 thread pitches, wherein it is particularly preferred when the thickness is in a range of between one and two thread pitches, e.g. at about 1.5 thread pitches. Using a thickness of the annular disk at its inner diameter of more than two thread pitches, in practice, will create a too large breaking effect of the lock nut when screwing-in the bolt, in many applications, wherein the breaking effect and the clamping force are also dependent on the total dimensions of the lock nut and the nut thread as well as of the size of the axial offset of the thread of the annular disk 22 relative to the nut thread 16, as discussed below.

Figure 5:
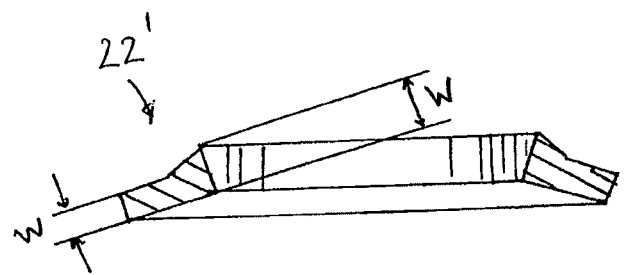
FIG. 5 shows a section through a locking washer disk according to an embodiment of the invention, before being assembled.
Figure 6:
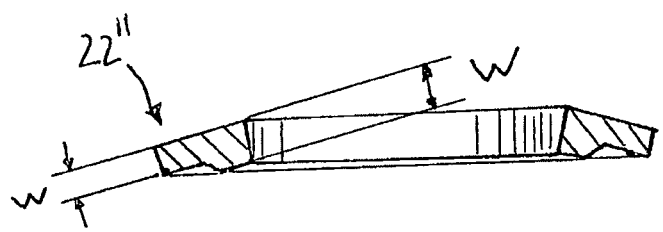
FIG. 6 shows a section through a locking washer disk according to another embodiment of the invention before being assembled.
Figure 7:
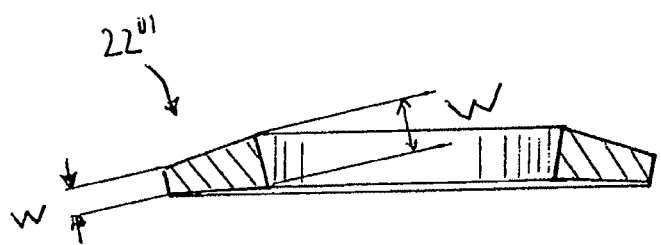
FIG. 7 shows a section through a locking washer disk according to another embodiment of the invention before being assembled.

When manufacturing the lock nut according to the invention, the annular disk 22 first is inserted into the accommodation space 20 formed by the neck extension 14 wherein, in this preassembled state, the annular disk 22 has a convex curvature in the direction of the end face of the lock nut, as shown in FIGS. 5 to 7 and as further described with reference to these drawings.

Figure 3:
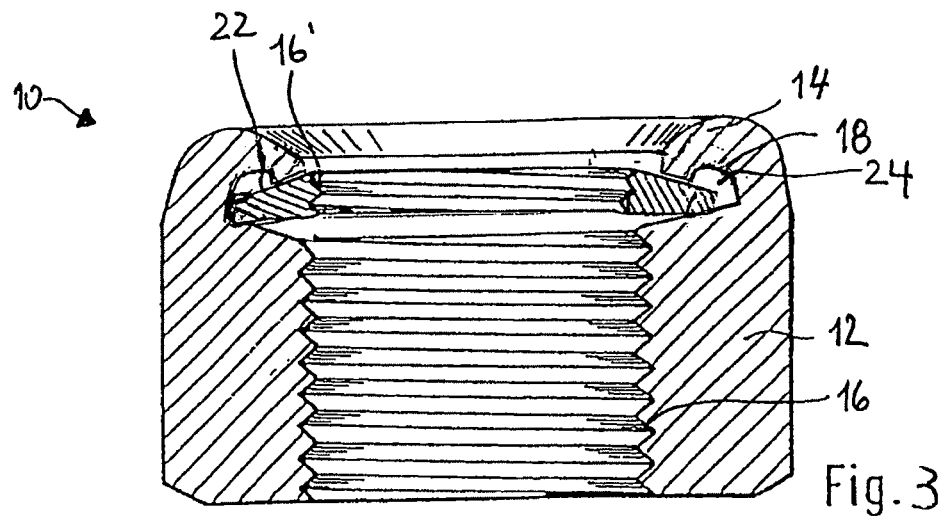
FIG. 3 shows a vertical section through the lock nut according to the invention when completely assembled, along line III-III.
Figure 4:
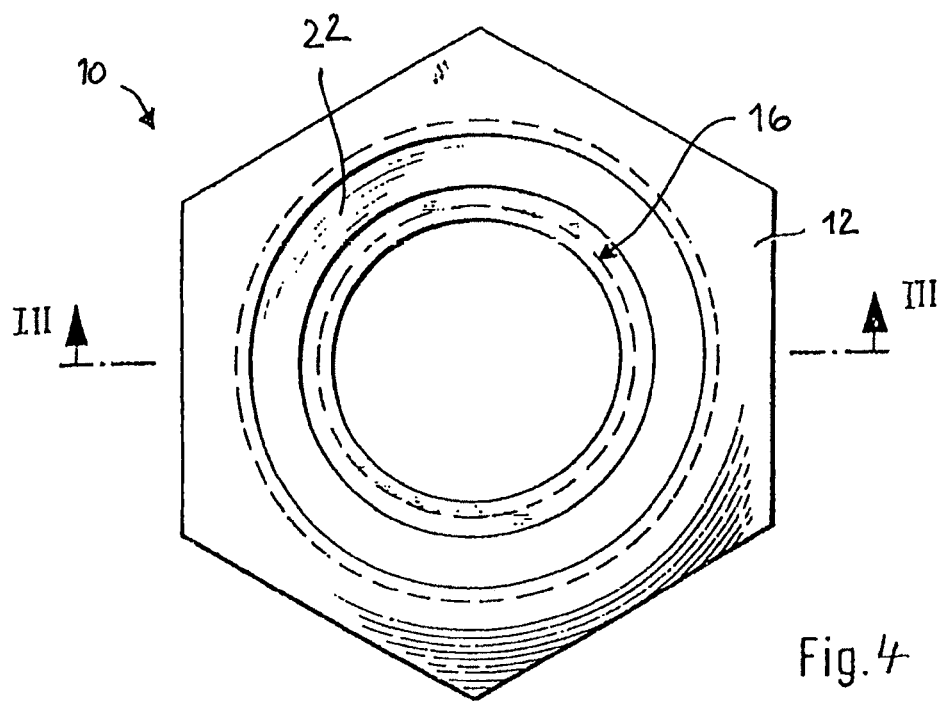
FIG. 4 shows a plan view of the lock nut according to FIG. 3.

Subsequently, the neck extension 14 is contracted by crimping at its upper end as shown in FIGS. 3 and 4, so that the annular disk 22 is now held in the groove 24 which is formed thereby, without being movable in the axial direction. After fixing the annular disk 22, a common cutting tool is used for cutting the internal thread 16 into the nut body 12. As the annular disk 22 has substantially the same inner diameter as the nut body, the cutting tool also cuts a thread 16' corresponding to the nut thread 16 into the inner edge of the annular disk 22. Subsequently, a punch or the like is used for slightly deforming the inner area of the annular disk 22 in an axial direction towards the nut thread 16 so that the nut thread 16 and the internal 16' of the annular disk 22 are offset axially. This axial offset should correspond to about a quarter to half of a thread pitch so that the relative offset of the two threads is between a quarter and a half of a thread pitch.

In the preferred embodiment of the invention, the locking washer disk 22 has a convex curvature in a direction of the end face of the nut body 12, in its preassembled state, i.e. a curvature facing away from the nut thread 16. When forming the axial offset by means of a punch or the like, this convex curvature is reduced but not compensated or even reversed. By using this pre-curvature of the locking washer disk in its pre-assembled state, a defined deforming behaviour when providing the axial offset can be guaranteed and hence a precise adjustment of the axial offset and the resulting clamping force of the lock nut is achieved.

A bolt screwed into the nut, not shown, will be clamped on all sides by the annular disk 22 wherein the spring force of the annular disk in the axial direction largely determines the clamping force. The spring force of the annular disk 22 is largely determined by its elasticity. FIGS. 5 to 7 show examples of the locking washer disk according to the invention for optimizing the elasticity of the annular disk and the clamping force of the lock nut.

FIGS. 5 to 7 show possible embodiments for implementing the locking washer disk 22', 22" and 22''' having a reduced thickness towards its outer diameter. The embodiments of the locking washer disk 22', 22", 22''' shown in FIGS. 5 to 7 do not comprise segmented recesses at the periphery. However such recesses and/or differently shaped recesses for increasing the elasticity of the annular disk can be provided also in the annular disks 22', 22", 22''' shown in FIGS. 5 to 7.

In the embodiment shown in FIGS. 5 to 7, the thickness of the annular disk 22', 22", 22''' at its outer diameter is designated as w and the thickness of the annular disk 22', 22", 22''' at its inner diameter is designated as W. According to the invention W>w, wherein the thickness w at the outer diameter preferably is smaller or the same as one thread pitch and larger than half a thread pitch of the nut thread 16, e.g. 0.75 thread pitches, and wherein the thickness W at the inner diameter is larger or the same as one thread pitch and preferably smaller than 2.5 thread pitches, e.g. 1.5 thread pitches. The exact dimensions of the annular disk 22', 22", 22''' are dependent on the desired elasticity of the annular disk, the clamping force of the lock nut to be adjusted, the materials used, the total dimensions of the lock nut and the nut thread. The decrease of thickness of the annular disk 22', 22", 22''' can be continuous as shown in FIG. 7, or stepped as shown in FIGS. 5 and 6 wherein one or more steps can be provided, the steps can be tilted, as shown in FIGS. 5 and 6, or can be located at an angle of 90°. Also the position of the step or steps in the radial direction can have an influence on the elasticity of the annular disk 22', 22". The thickness reduction can also have another contour as the one shown and can be e.g. parabolic or hyperbolic. The invention is not limited to the embodiments shown.

When an annular disk 22', 22", 22''', as the one shown in FIGS. 5 to 7, is inserted into a lock nut according to FIGS. 1 to 4, the annular disk 22', 22", 22''' is inserted into the accommodating space 20 in such way that its convex curvature is facing to the outside (upwards in the drawings). When deforming the disk using a punch or like, the annular disk 22', 22", 22''' is pressed at its inner edge towards the nut thread 16 wherein it maintains it convex curvature; this curvature hence is reduced but is neither compensated nor reversed. The curvature of the locking washer disk can be produced simply when manufacturing the disk, e.g. when stamping the disk from spring band steel.

Figure 8:
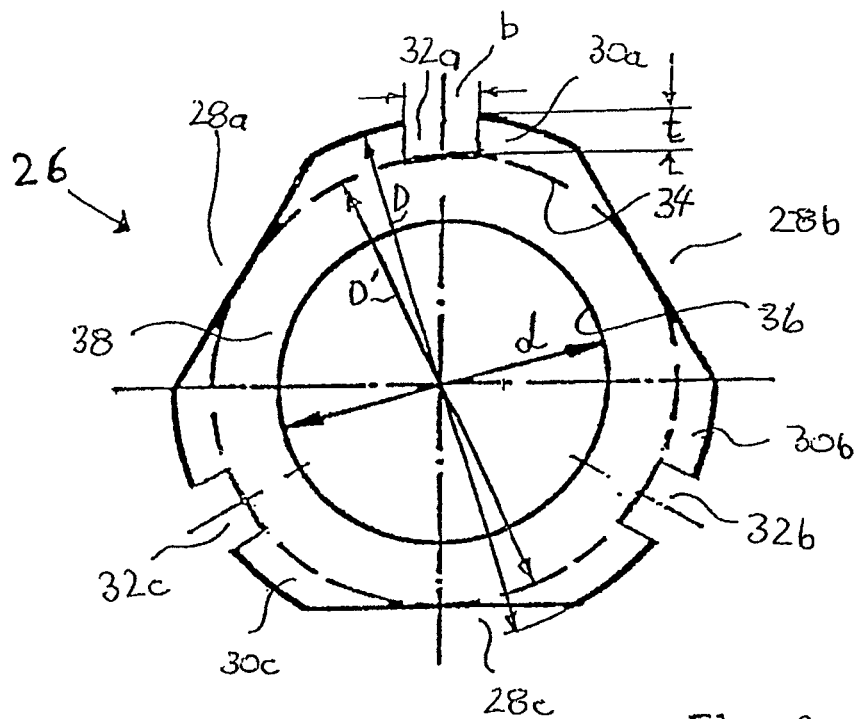
FIG. 8 shows a plan view of an alternative locking washer disk for use in the lock nut according to the invention.
Figure 9:
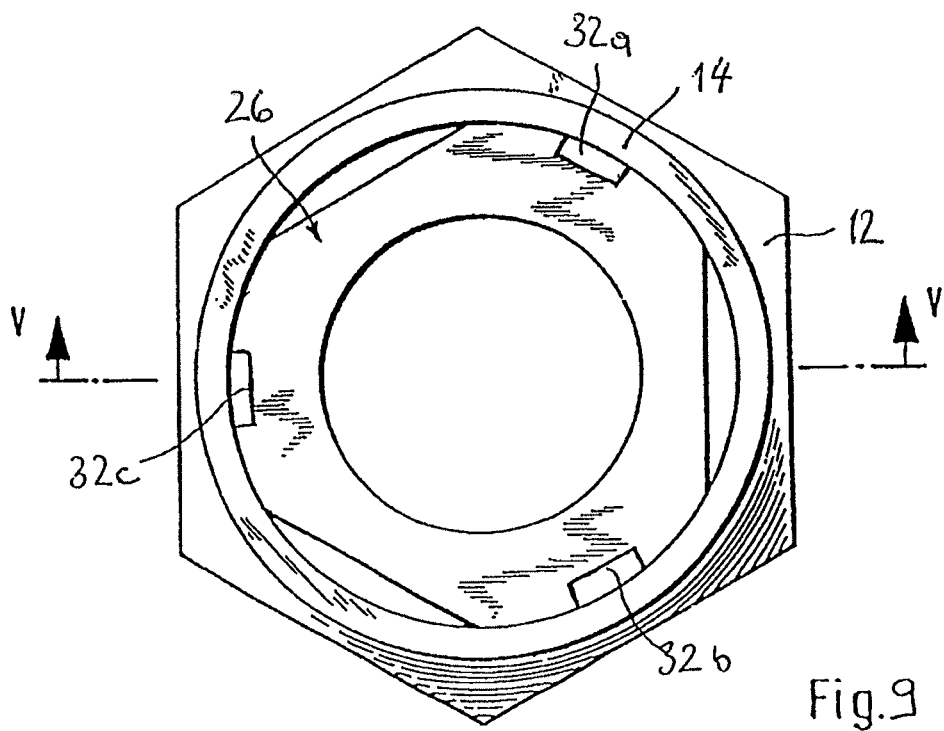
FIG. 9 shows a plan view of a lock nut wherein the locking washer disk according to FIG. 5 has been inserted.

A further embodiment of the locking washer disk and the lock nut according to the invention is shown in FIGS. 8 and 9 wherein the thickness reductions or taper of the locking washer disk can not be recognized in these drawings.

The annular disk has an outer diameter D and an inner diameter d and comprises three segment-like recesses 28a, 28b, 28c. Between these recesses, peripheral regions of the annular disk 26 are remaining, shown at 30a, 30b, 30c. In each of these peripheral regions 30a, 30b, 30c, there is a central notch 32a, 32b, 32c having a rectangular shape, including parallel side walls. The radial depth t of these notches is such that it is the same as the maximum depth of the segment-like recesses 28a, 28b, 28c. This results in an inner ring region 38, free of recesses, notches and the like, which provides the necessary stability, this region lying between an imaginary inscribed circle 34 having a diameter D' and the inner edge 36 of the annular disk 30. The maximum radial depth of segment-like recesses 28a, 28b, 28c preferably is about on third of the maximum radial dimension of the locking washer disk 36. The width b of the notches 32a, 32b, 32c preferable is in the range of between one quarter and one third of the peripheral extension of the respective peripheral regions 30a, 30b, 30c.

In all embodiments, notches as well as segment-like recesses and recesses in the form of partial circular tracks can be formed at the time when manufacturing the locking washer disk 26 or can be cut into the annular disk at a later point in time.

By shaping the annular disk according to the invention, the spring-force and elasticity of the annular disk is increased when compared to known locking washer disks, without compromising its stability. This allows to achieve high clamping forces and also to better guarantee that the lock nut maintains its original elasticity and hence its usefulness through many operation cycles. The clamping force can be adjusted by means of the thickness W of the annular disk at its inner diameter.

Figure 10:
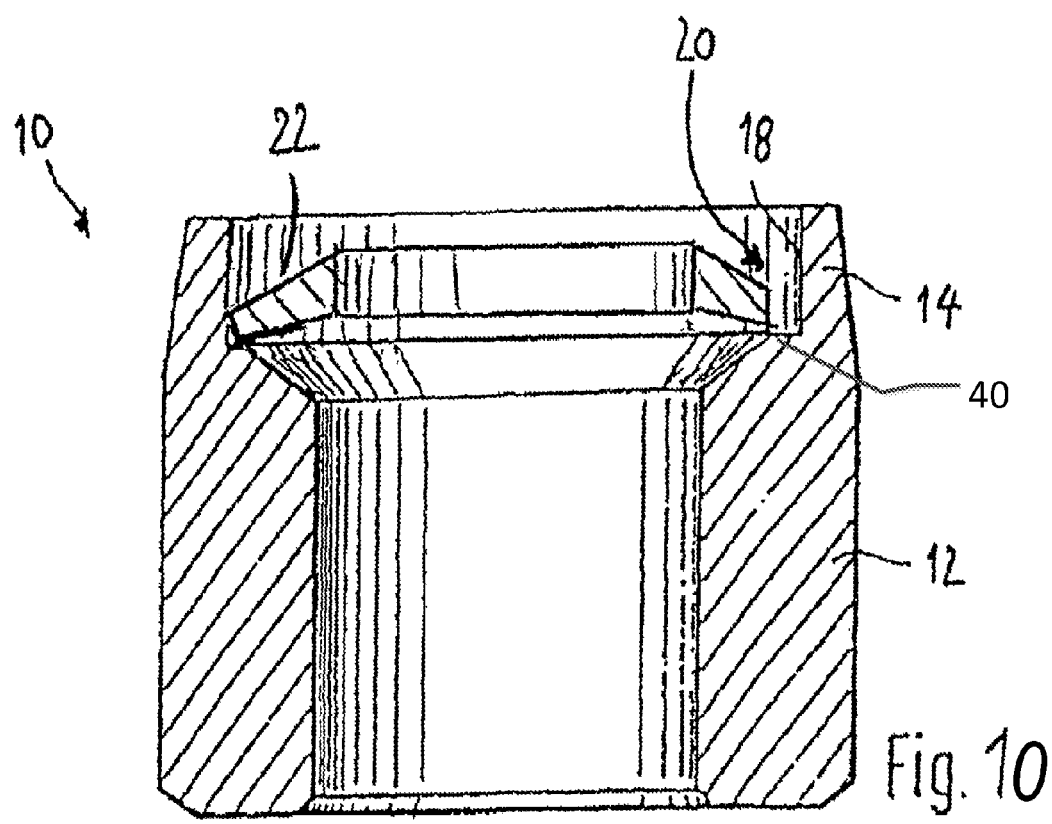
FIG. 10 illustrates a step or extension which is deformable when the inner annular disk is clamped in the groove when crimping the neck extension.

In a further embodiment of the invention, illustrated in FIG. 10, at the inner edge of the accommodations space 20 and/or the outer edge of the inner annular disk 22, a step or extension 40 can be provided which is deformable when the inner annular disk is clamped in the groove 24 when crimping the neck extension 14. This can be used for compensating for manufacturing tolerances of the nut body 12 and the locking washer disk 22.

The features disclosed in the description above, the drawings and the claims can be important both individually as well as in combination for implementing the invention in its various embodiments

LIST OF REFERENCE NUMBERS 10 lock nut
12 nut body
14 neck extension
16 internal thread, nut thread
16' internal thread
18 inner edge of neck extension 14
20 accommodation space
22', 22", 22''' locking washer disk, annular disk
24 nut
26 locking washer disk, annular disk
28a, 28b, 28c recesses
30a, 30b, 30c peripheral regions
32a, 32b, 32c notches
34 inscribed circle
36 inner edge of annular disk
38 inner ring region
W thickness of annular disk at inner diameter
w thickness of annular disk at outer diameter
D outer diameter of annular disk
d inner diameter of annular disk
D' diameter of inscribed circle

The invention claimed is:

1. A lock nut comprising:
a nut body having a threaded section including a first internal thread and a neck extension, the neck extension including an inner wall forming an inner annular groove adjacent to the first internal thread; an inner annular disk of metal which is held in the inner annular groove;
at an inner circumference of the inner annular disk, a second internal thread corresponding to the first internal thread of the threaded section; wherein the second internal thread of the inner annular disk is offset axially relative to the first internal thread of the nut body by a distance which is smaller than a thread pitch of the first internal thread, a thickness (W) of the inner annular disk at its inner diameter is larger than a thickness (w) of the inner annular disk at its outer diameter; and
wherein the inner annular groove includes a surface extending from the first internal thread to the inner wall of the neck extension, and the inner annular disk includes a surface extending from the second internal thread to an outer periphery of the inner annular disk wherein either at least a portion of the surface of the inner annular groove or a portion of the surface of the inner annular disk includes a deformable step, the deformable step compensating for manufacturing tolerances and being deformed when the inner annular disk is crimped in the inner annular groove.

2. The lock nut according to claim 1, wherein the thickness (w) of the inner annular disk at its outer diameter is the same or smaller than about one thread pitch of the internal thread.

3. The lock nut according to claim 2, wherein the thickness (w) of the inner annular disk at its outer diameter is larger or the same as half a thread pitch.

4. The lock nut according to claim 1, wherein the thickness (W) of the inner annular disk at its inner diameter is in the range of about one thread pitch to about 1.5 thread pitches of the internal thread.

5. The lock nut according to claim 4, wherein the thickness (W) of the inner annular disk at its inner diameter is between one and two thread pitches.

6. The lock nut according to claim 1 wherein the thickness (w) of the inner annular disk at its outer diameter is about 0.75 thread pitches and the thickness (W) of the inner annular disk at its inner diameter is about 1.5 of thread pitches of the internal thread.

7. The lock nut according to claim 1, wherein the inner annular disk has a thickness which increases stepwise from its outer diameter to its inner diameter, wherein the deformable step is tilted relative to the axis of the inner annular disk.

8. The lock nut according to claim 1, wherein the inner annular disk is curved convexly towards the end face of the lock nut and away from said first internal thread.

9. The lock nut according to claim 1, wherein the internal thread of the inner annular disk is offset axially relative to the internal thread of the nut body by a distance which is about one fourth to one half of the thread pitch.

10. The lock nut according to claim 1, wherein, in the outer periphery of the annular disk, a plurality of recesses are formed, the recesses being equally spaced along the periphery of the annular disk.

11. The lock nut according to claim 10 wherein said recesses form protruding claws having essentially radially extending sidewalls wherein said claws hold said annular disk within said annular groove by means of friction, and that the recesses between said claws, together with the remaining material of annular disk, form ring sections having at least the same peripheral dimensions as said claws.

12. The lock nut according to claim 11, wherein three claws are spaced along the periphery.

13. The lock nut according to claim 1, wherein said inner annular disk is manufactured from spring steel.

14. A method of manufacturing a lock nut according to claim 1, wherein the annular disk is inserted into a recess in a neck extension of the unthreaded nut body and the neck extension is crimped radially towards the inside for clamping the outer edge of the annular disk in the axial direction and, subsequently, in a one-step process, an identical internal thread is cut into the nut body and the annular disk and, finally, the inner part of the annular disk is deformed by a defined distance in an axial direction.

15. The method of claim 14, wherein the annular disk is manufactured in a pre-processing step to have a convex curvature and is inserted into the recess in the neck extension of the nut body so that the annular disk is curved convexly into the direction of the end face of the lock nut wherein the convex curvature of the annular disk is reduced upon deformation but will be not reversed.

16. A lock nut comprising:
a nut body having a threaded section including a first internal thread and a neck extension including an inner wall forming an inner annular groove adjacent to the first internal thread and an inner annular disk of metal which is held in the inner annular groove;
at an inner circumference of the inner annular disk, a second internal thread corresponding to the first internal thread of the threaded section is cut and the second internal thread of the inner annular disk is offset axially relative to the first internal thread of the nut body by a distance which is smaller than a thread pitch of the first internal thread; and wherein a thickness (W) of the inner annular disk at its inner diameter is larger than a thickness (w) of the inner annular disk at its outer diameter, wherein the inner annular disk has a thickness which, from its outer diameter to its inner diameter, increases and is curved convexly towards the end face of the lock nut and away from said first internal thread; and wherein the inner annular groove includes a surface extending from the first internal thread to the inner wall of the neck extension, and the inner annular disk includes a surface extending from the second internal thread to an outer periphery of the inner annular disk wherein either at least a portion of the surface of the inner annular groove or a portion of the surface of the inner annular disk includes a deformable step, the deformable step compensating for manufacturing tolerances and being deformed when the inner annular disk is crimped by the inner annular groove.

17. A lock nut comprising:

a nut body having a threaded section including a first internal thread and a neck extension, the neck extension including an inner wall forming an inner annular groove adjacent to the first internal thread; and an inner annular disk of metal which is held in the inner annular groove; at an inner circumference of the inner annular disk, a second internal thread corresponding to the first internal thread of the threaded section; wherein the second internal thread of the inner annular disk is offset axially relative to the first internal thread of the nut body by a distance which is smaller than a thread pitch of the first internal thread, wherein the inner annular groove includes a surface extending from the first internal thread to the inner wall of the neck extension, and the inner annular disk includes a surface extending from the second internal thread to an outer periphery of the inner annular disk, and wherein either at least a portion of the surface of the inner annular groove or a portion of the surface of the inner annular disk includes a deformable step, the deformable step compensating for manufacturing tolerances and being deformed when the inner annular disk is crimped in the inner annular groove.

* * * * *

UNITED STATES PATENT AND TRADEMARK OFFICE
CERTIFICATE OF CORRECTION

| | | |
|---|---|---|
| PATENT NO. | : 9,267,534 B2 | |
| APPLICATION NO. | : 13/382139 | |
| DATED | : February 23, 2016 | |
| INVENTOR(S) | : Hartmut Flaig | |

It is certified that error appears in the above-identified patent and that said Letters Patent is hereby corrected as shown below:

In the Title page, line 11 item (57) of the Abstract, delete "diameter to" and insert -- diameter --, therefor.

In the Claims

In column 8, line 55, in claim 16, after "thread" insert -- ; --.

Signed and Sealed this
Twenty-third Day of August, 2016

Michelle K. Lee
*Director of the United States Patent and Trademark Office*